United States Patent
Choi et al.

(10) Patent No.: US 9,604,883 B2
(45) Date of Patent: Mar. 28, 2017

(54) DIELECTRIC COMPOSITION AND MULTILAYER CERAMIC CAPACITOR CONTAINING THE SAME

(71) Applicant: SAMSUNG ELECTRO-MECHANICS CO., LTD., Suwon-Si, Gyeonggi-Do (KR)

(72) Inventors: Du Won Choi, Suwon-Si (KR); Sung Hyung Kang, Suwon-Si (KR); Chang Hoon Kim, Suwon-Si (KR)

(73) Assignee: SAMSUNG ELECTRO-MECHANICS CO., LTD., Suwon-si, Gyeonggi-Do (KR)

(*) Notice: Subject to any disclaimer, the term of this patent is extended or adjusted under 35 U.S.C. 154(b) by 0 days.

(21) Appl. No.: 14/919,660

(22) Filed: Oct. 21, 2015

(65) Prior Publication Data

US 2016/0221878 A1 Aug. 4, 2016

(30) Foreign Application Priority Data

Feb. 3, 2015 (KR) ......................... 10-2015-0016585

(51) Int. Cl.
*C04B 35/468* (2006.01)
*H01G 4/12* (2006.01)
(Continued)

(52) U.S. Cl.
CPC ......... *C04B 35/4682* (2013.01); *H01G 4/012* (2013.01); *H01G 4/12* (2013.01); *H01G 4/248* (2013.01); *H01G 4/30* (2013.01); *C04B 2235/3206* (2013.01); *C04B 2235/3208* (2013.01); *C04B 2235/3215* (2013.01); *C04B 2235/3217* (2013.01); *C04B 2235/3224* (2013.01); *C04B 2235/3225* (2013.01); *C04B 2235/3239* (2013.01); *C04B 2235/3241* (2013.01); *C04B 2235/3262* (2013.01); *C04B 2235/3272* (2013.01); *C04B 2235/3275* (2013.01); *C04B 2235/3279* (2013.01); *C04B 2235/3293* (2013.01);
(Continued)

(58) Field of Classification Search
CPC .. C04B 35/468; C04B 35/4682; H01G 4/1227
See application file for complete search history.

(56) References Cited

U.S. PATENT DOCUMENTS 5,841,625 A * 11/1998 Hennings ............. H01G 4/1227
361/305
6,043,974 A * 3/2000 Chen ................... C04B 35/4682
361/311
(Continued)

FOREIGN PATENT DOCUMENTS

JP 2012-091956 A 5/2012
KR 10-2013-0106569 A 9/2013
WO 2006035535 * 6/2006

*Primary Examiner* — Karl Group
(74) *Attorney, Agent, or Firm* — McDermott Will & Emery LLP

(57) ABSTRACT

A dielectric composition includes a main ingredient and accessory ingredients. The main ingredient is represented by $Ba_m(Ti_{(1-y)}M_y)O_3$ ($0.990 < m < 1.015$, $0.001 \le y \le 0.010$), where M is a transition metal including at least one of a pentavalent transition metal and a trivalent transition metal.

10 Claims, 1 Drawing Sheet

(51) Int. Cl.
*H01G 4/012* (2006.01)
*H01G 4/248* (2006.01)
*H01G 4/30* (2006.01)

(52) U.S. Cl.
CPC .. *C04B 2235/3418* (2013.01); *C04B 2235/36* (2013.01); *C04B 2235/3817* (2013.01); *C04B 2235/6582* (2013.01); *C04B 2235/663* (2013.01); *C04B 2235/79* (2013.01)

(56) References Cited

U.S. PATENT DOCUMENTS

| | | | |
|---|---|---|---|
| 8,320,103 B2* | 11/2012 | Yao | C04B 35/4682 |
| | | | 361/321.4 |
| 8,456,798 B2* | 6/2013 | Natsui | C01G 23/006 |
| | | | 361/306.3 |
| 8,488,298 B2* | 7/2013 | Yao | C04B 35/4682 |
| | | | 361/321.1 |
| 2011/0019333 A1* | 1/2011 | Yao | C04B 35/4682 |
| | | | 361/301.4 |
| 2011/0110017 A1* | 5/2011 | Natsui | C01G 23/006 |
| | | | 361/321.1 |
| 2011/0110018 A1* | 5/2011 | Ishii | C01G 23/006 |
| | | | 361/321.5 |
| 2011/0235235 A1* | 9/2011 | Yao | C04B 35/4682 |
| | | | 361/321.4 |
| 2012/0250216 A1* | 10/2012 | Ishii | C04B 35/4682 |
| | | | 361/301.4 |
| 2013/0250478 A1 | 9/2013 | Kim et al. | |
| 2014/0002955 A1* | 1/2014 | Takeoka | C04B 35/4682 |
| | | | 361/321.4 |
| 2015/0349239 A1* | 12/2015 | Murakami | G02B 27/0006 |
| | | | 428/402 |

* cited by examiner

A-A'

DIELECTRIC COMPOSITION AND MULTILAYER CERAMIC CAPACITOR CONTAINING THE SAME

CROSS-REFERENCE TO RELATED APPLICATION

This application claims the benefit of priority to Korean Patent Application No. 10-2015-0016585, filed on Feb. 3, 2015 with the Korean Intellectual Property Office, the entirety of which is incorporated herein by reference.

BACKGROUND

The present disclosure relates to a dielectric composition having high permittivity and excellent reliability, and a multilayer ceramic capacitor containing the same.

Recently, as electronic devices such as display devices and central processing units of computers (CPUs) have increased in size, a heat generation problem has become severe. Therefore, market needs for an X5R (operation temperature: −55° C. to 85° C.) or X7R (operation temperature: −25° C. to 125° C.) multilayer ceramic capacitor capable of securing stable capacitance and reliability at a high temperature for stable operation of an integrated circuit (IC) have increased.

Further, in accordance with general trends toward miniaturization, lightness, and multi-functionality of electronic products, a multilayer ceramic capacitor (MLCC) chip having a small size, high capacitance, and high pressure has continuously been demanded. Therefore, excellent withstand voltage and DC-bias characteristics in addition to slimness of a dielectric layer have been considered important in developing the X5R or X7R multilayer ceramic capacitor.

The thinness and high pressure increase the intensity of the electric field applied to the dielectric layer, and this may deteriorate the DC-bias and withstand voltage characteristics. Particularly, a fine structural defect due to the thinness may have a severe negative influence on the withstand voltage characteristics such as breakdown voltage (BDV), high-temperature insulation resistance (IR), and the like.

In order to avoid these problems, the main ingredient of the base material should be essentially atomized. However, when the grain size of the main ingredient of the base material is decreased, it may be more difficult to implement capacitance temperature characteristics, and permittivity may be decreased.

As a result, the capacitance of the capacitor may be decreased, and even when the permittivity of the dielectric layer is at a satisfactory level, the slimness of the layer and the strength of the electric field may lead to the result that the desired reliability may not be satisfied.

In order to solve this problem, a dielectric composition having excellent reliability and permittivity without atomizing a main ingredient of a base material should be developed.

SUMMARY

An exemplary embodiment in the present disclosure may provide a dielectric composition having high permittivity and excellent reliability, and a multilayer ceramic capacitor containing the same.

According to an exemplary embodiment in the present disclosure, a dielectric composition comprises a main ingredient and accessory ingredients, wherein the main ingredient is represented by $Ba_m(Ti_{(1-y)}M_y)O_3$ ($0.990<m<1.015$, $0.001 \leq y \leq 0.010$), where M is a transition metal including at least one of a pentavalent transition metal and a trivalent transition metal.

The accessory ingredients may include: 0.5 to 1.4 moles of a first accessory ingredient, an oxide or carbide containing at least one of magnesium (Mg), barium (Ba), and calcium (Ca), based on 100 moles of the main ingredient; a second accessory ingredient, an oxide containing silicon (Si) or a glass compound containing silicon (Si); 0.6 to 1.5 moles of a third accessory ingredient, an oxide containing at least one of dysprosium (Dy), yttrium (Y), tin (Sn), holmium (Ho), and gadolinium (Gd), based on 100 moles of the main ingredient; and a fourth accessory ingredient, an oxide containing aluminum (Al).

The transition metal may include at least one of manganese (Mn), chromium (Cr), vanadium (V), nickel (Ni), iron (Fe), and cobalt (Co).

y may be $\alpha+\beta$ ($y=\alpha+\beta$), and a content ratio ($\alpha/\beta$) of the pentavalent transition metal and the trivalent transition metal may satisfy $0.4 \leq \alpha/\beta \leq 2.0$, where $\alpha$ is a molar concentration of the pentavalent transition metal, and $\beta$ is a molar concentration of the trivalent transition metal.

a and b may satisfy $a \leq b \leq 2a$, where a is a content of the first accessory ingredient, and b is a content of the second accessory ingredient is b.

A content of the fourth accessory ingredient may be 0.1 to 0.5 moles, based on 100 moles of the main ingredient.

According to another exemplary embodiment in the present disclosure, a multilayer ceramic capacitor comprises a ceramic body having a structure in which dielectric layers and first and second internal electrodes are alternately stacked; and first and second external electrodes formed on both end portions of the ceramic body and electrically connected to the first and second internal electrodes, respectively, wherein the dielectric layers contain a main ingredient and accessory ingredients, the main ingredient being represented by $Ba_m(Ti_{(1-y)}M_y)O_3$ ($0.990<m<1.015$, $0.001 \leq y \leq 0.010$), where M is a transition metal including at least one of a pentavalent transition metal and a trivalent transition metal.

BRIEF DESCRIPTION OF DRAWINGS

The above and other aspects, features and advantages of the present disclosure will be more clearly understood from the following detailed description taken in conjunction with the accompanying drawings.

DETAILED DESCRIPTION

Figure 1:
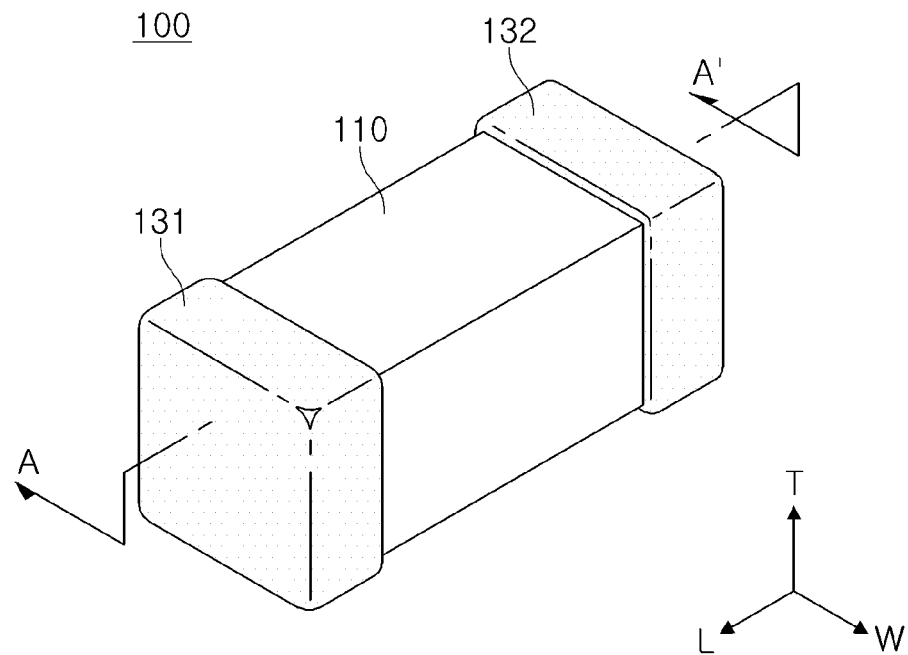
FIG. 1 is a schematic perspective view of a multilayer ceramic capacitor according to an exemplary embodiment in the present disclosure.

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

The present disclosure relates to a dielectric composition. Examples of electronic components containing dielectric compositions include capacitors, inductors, piezoelectric elements, varistors, thermistors, or the like. Hereinafter, the dielectric composition and a multilayer ceramic capacitor as an example of the electronic component will be described.

A dielectric composition, according to an exemplary embodiment, may contain a main ingredient of a base material and accessory ingredients, wherein the main ingredient of the base material is represented by $Ba_m(Ti_{(1-y)}M_y)O_3$ (0.990<m<1.015, 0.001≤y≤0.010), and a transition metal M includes at least one of a pentavalent transition metal and a trivalent transition metal.

The dielectric composition, according to the present disclosure, may be sintered at 1180° C. or less under a reducing atmosphere, and may have permittivity of 6000 or more at room temperature.

Further, the multilayer ceramic capacitor using the dielectric composition may operate at −55° C. to 85° C. and secure high permittivity and reliability without particle growth of dielectric grains in dielectric layers.

Hereinafter, each ingredient of the dielectric composition, according to an exemplary embodiment, will be described in detail.

Base Material Main Ingredient

In the dielectric composition, according to an exemplary embodiment, the main ingredient of the base material may be represented by $Ba_m(Ti_{(1-y)}M_y)O_3$ (0.990<m<1.015, 0.001≤y≤0.010), and the transition metal M may include at least one of a pentavalent transition metal and trivalent transition metal.

Here, m and y may be factors in determining the makeup of the main ingredient of the base material.

In this case, m may be 0.990 to 1.015.

When m is less than 0.990, Ba may be easily reduced in the sintering under the reducing atmosphere, and thus the main ingredient of the base material may be changed into a semiconducting material.

When m is more than 1.015, the sintering temperature may be increased.

The main ingredient of the base material, which is doped with the transition metal, may be represented by $Ba_m(Ti_{(1-y)}M_y)O_3$.

The transition metal M may include at least one of pentavalent transition metals ($M^{5+}$) or trivalent transition metals ($M^{3+}$).

The transition metal may include at least one of manganese (Mn), chromium (Cr), vanadium (V), nickel (Ni), iron (Fe), and cobalt (Co).

The pentavalent transition metal is solid-dissolved in barium titanate (BT) to form free electrons, and the trivalent transition metal may serve as impurities of barium titanate to form holes in a lattice. Here, one of the free electron or the hole is excessively formed as compared to the other, which may generate problems in the reliability of the final product.

In addition, even when the transition metal is solid-dissolved in barium titanate, a valence electron may be changed. Therefore, energy may be structurally absorbed and released in a particle, and this behavior may increase trap energy in the particle, thereby improving reliability.

However, when a content of the transition metal is out of a predetermined range, a balance of a total electric charge ratio may be lost, and thus an IR value at room temperature or a high temperature may be decreased and reliability may not be secured.

In the dielectric composition according to the present disclosure, when a molar concentration of the pentavalent transition metal is α, and a molar concentration of the trivalent transition metal is β, y may be α+β (y=α+β), and a content ratio (α/β) of the pentavalent transition metal and the trivalent transition metal may satisfy 0.4≤α/β≤2.0.

The content of the pentavalent transition metal may satisfy α≥0, and the content of the trivalent transition metal may satisfy β>0.

When the number of particles in a dielectric layer has a large influence on permittivity of the dielectric layer, distribution of a transition metal in the particles may have a large influence on reliability of a capacitor.

A concentration of the transition metal of the particle in the dielectric layer is discontinuous, which means that the transition metal is not uniformly solid-dissolved.

When the content ratio (α/β) of the pentavalent transition metal and the trivalent transition metal satisfies 0.4≤α/β≤2.0, the transition metals may be maximally solid-dissolved in the particle, such that the trap energy in the particle may be increased, and thus reliability of the dielectric layer may be improved.

When the content ratio of the pentavalent transition metal and the trivalent transition metal is less than 0.4, the concentration of the transition metal in the particle may be discontinuous, and thus an effect of the transition metal may not be obtained.

When the content ratio of the pentavalent transition metal and the trivalent transition metal is more than 2.0, the transition metals may be excessively solid-dissolved in the particle, and thus permittivity of the capacitor may be decreased and aging may be increased.

Here, y, which is a sum of the contents of the pentavalent transition metal and the trivalent transition metal, may be 0.001 to 0.010.

When y is less than 0.001, it may be difficult to implement reduction resistance of the capacitor, and when y is more than 0.010, the aging of the capacitor may be increased, high-temperature insulation resistance (IR) characteristics may be deteriorated, and permittivity may be decreased.

Accessory Ingredients

According to an exemplary embodiment, the dielectric composition may contain the main ingredient of the base material and the accessory ingredients, wherein the accessory ingredients may include 0.5 to 1.4 moles of a first accessory ingredient, an oxide or carbide containing at least one of magnesium (Mg), barium (Ba), and calcium (Ca), based on 100 moles of the main ingredient of the base material; a second accessory ingredient, an oxide containing silicon (Si) or a glass compound containing silicon (Si); 0.6 to 1.5 moles of a third accessory ingredient, an oxide containing at least one of dysprosium (Dy), yttrium (Y), tin (Sn), holmium (Ho), and gadolinium (Gd), based on 100 moles of the main ingredient of the base material; and a fourth accessory ingredient, an oxide containing aluminum (Al).

Reduction resistance of the capacitor may be implemented by the main ingredient of the base material, but when the dielectric layer is formed of only the main ingredient of the base material, the sintering temperature may be increased, and it may be difficult to satisfy important temperature characteristics of the multilayer ceramic capacitor.

According to the present exemplary embodiment, in order to solve the above-mentioned problems, the accessory ingredients may include 0.5 to 1.4 moles of the first accessory ingredient, the oxide or carbide containing at least one of magnesium (Mg), barium (Ba), and calcium (Ca), based on 100 moles of the main ingredient of the base material; the second accessory ingredient, the oxide containing silicon (Si) or the glass compound containing Si; 0.6 to 1.5 moles of the third accessory ingredient, the oxide containing at least one of dysprosium (Dy), yttrium (Y), tin (Sn), holmium (Ho), and gadolinium (Gd), based on 100 moles of the main ingredient of the base material; and the fourth accessory ingredient, the oxide containing aluminum (Al).

The first accessory ingredient may be the oxide or carbide containing at least one of magnesium (Mg), barium (Ba), and calcium (Ca).

The first accessory ingredient, which is an element having an influence on forming a shell of a dielectric particle, may be a factor in implementing sintering stability and dielectric properties.

A content of the first accessory ingredient may be 0.5 to 1.4 moles based on 100 moles of the main ingredient of the base material.

When the content of the first accessory ingredient is less than 0.5 moles, reliability and sintering stability of the capacitor may be deteriorated, and when the content of the first accessory ingredient is more than 1.4 moles, when the capacitor is manufactured, the sintering temperature may be increased, and permittivity of the capacitor may be decreased.

The second accessory ingredient may be the oxide containing silicon (Si) or the glass compound containing silicon (Si).

The second accessory ingredient may serve to control the sintering temperature when the capacitor is manufactured.

When the content of the first accessory ingredient is a, and the content of the second accessory ingredient is b, the content of the second accessory ingredient may satisfy $a \leq b \leq 2a$.

When the content of the second accessory ingredient is less than the content of the first accessory ingredient (a>b), the sintering temperature may be increased, and thus connectivity of internal electrodes may be deteriorated and permittivity may be decreased.

When the content of the second accessory ingredient is more than two times the content of the first accessory ingredient (b>2a), a secondary phase of silicon (Si) may be present in interfaces of dielectric particles, and thus reliability of the capacitor may be deteriorated and temperature coefficient of capacitance (TCC) characteristics may become unstable.

The third accessory ingredient may be the oxide containing at least one of dysprosium (Dy), yttrium (Y), tin (Sn), holmium (Ho), and gadolinium (Gd).

The third accessory ingredient is an element that may affect characteristics of the capacitor such as permittivity, reliability, and TCC characteristics of the capacitor.

A content of the third accessory ingredient may be 0.6 to 1.5 moles based on 100 moles of the main ingredient of the base material.

When the content of the third accessory ingredient is less than 0.6 moles, permittivity of the capacitor may be decreased, and thus high capacitance characteristics of a product may not be implemented, and when the content of the third accessory ingredient is more than 1.5 moles, room-temperature IR and a high-temperature accelerated aging of the capacitor may be significantly decreased.

The fourth accessory ingredient may be the oxide containing aluminum (Al).

The fourth accessory ingredient is an element decreasing the sintering temperature and widening a sintering window when the capacitor is manufactured.

A content of the fourth accessory ingredient may be 0.1 to 0.5 moles based on 100 moles of the main ingredient of the base material.

Figure 2:
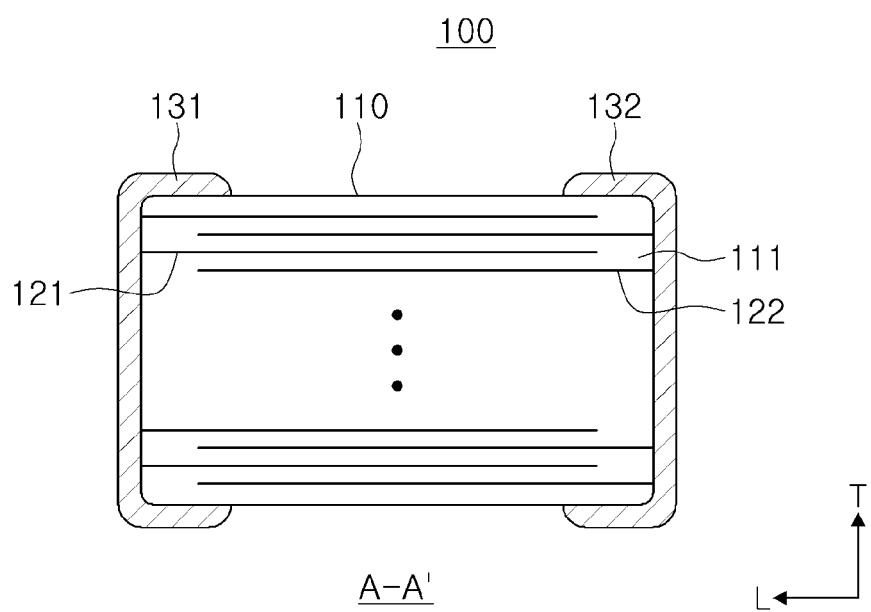
FIG. 2 is a schematic cross-sectional view of the multilayer ceramic capacitor taken along line A-A' of FIG. 1.

FIG. 1 is a schematic perspective view of a multilayer ceramic capacitor 100 according to an exemplary embodiment, and FIG. 2 is a schematic cross-sectional view of the multilayer ceramic capacitor 100 taken along the line A-A' of FIG. 1.

Referring to FIGS. 1 and 2, the multilayer ceramic capacitor 100, according to another exemplary embodiment, may include a ceramic body 110 having a structure in which dielectric layers 111 and first and second internal electrodes 121 and 122 are alternately stacked.

First and second external electrodes 131 and 132 electrically connected to the first and second internal electrodes 121 and 122 alternately disposed in the ceramic body 110, respectively, may be formed on both end portions of the ceramic body 110.

A shape of the ceramic body 110 is not particularly limited, but may be a rectangular parallelepiped shape. In addition, dimensions of the ceramic body are not particularly limited, but may be suitably adjusted depending on the use.

A thickness of the dielectric layer 111 may be optionally changed depending on a capacitance design of the capacitor. According to an exemplary embodiment, a thickness of a single dielectric layer after sintering may be 0.2 μm or more.

When the thickness of the dielectric layer is less than 0.2 μm, the number of crystal grains present in one layer may be small, such that reliability may be deteriorated.

The first and second internal electrodes 121 and 122 may be stacked so that end surfaces thereof are alternately exposed to surfaces of both end portions of the ceramic body 110 opposing each other, respectively.

The first and second external electrodes 131 and 132 may be formed on both end portions of the ceramic body 110 and electrically connected to the exposed end surfaces of the first and second internal electrodes 121 and 122 that are alternately disposed, thereby configuring a capacitor circuit.

Although a conductive material contained in the first and second internal electrodes 121 and 122 is not particularly limited, since a material configuring the dielectric layer according to the exemplary embodiment may have a form in which a paraelectric material and a ferroelectric material are mixed with each other or solid-dissolved, a noble metal may be used.

The noble metal used as the conductive material may be palladium (Pd) or a palladium (Pd) alloy.

An example of the palladium (Pd) alloy may be an alloy of palladium (Pd) and at least one element selected from manganese (Mn), chromium (Cr), cobalt (Co), and aluminum (Al), wherein a content of palladium (Pd) in the alloy may be 95 weight % or more.

The noble metal used as the conductive material may also be silver (Ag) or a silver (Ag) alloy.

A thickness of the first and second internal electrodes 121 and 122 may be appropriately determined depending on the use, or the like, but is not particularly limited. For example, the thickness may be 0.1 μm to 5 μm, or 0.1 μm to 2.5 μm.

A conductive material contained in the first and second external electrodes 131 and 132 is not particularly limited, but nickel (Ni), copper (Cu), or an alloy thereof may be used.

A thickness of the first and second external electrodes 131 and 132 may be appropriately determined depending on the use, or the like, but is not particularly limited. For example, the thickness may be 0.1 μm to 50 μm.

The dielectric layers 111 configuring the ceramic body 110 may contain the dielectric composition according to the exemplary embodiment.

The dielectric composition, according to the exemplary embodiment, may contain the main ingredient of the base material and the accessory ingredients, wherein the main ingredient of the base material may be represented by $Ba_m(Ti_{(1-y)}M_y)O_3$ (0.990<m<1.015, 0.001≤y≤0.010), and the transition metal M may include at least one of the pentavalent transition metal and trivalent transition metal.

The transition metal may include at least one of manganese (Mn), chromium (Cr), vanadium (V), nickel (Ni), iron (Fe), and cobalt (Co).

When the molar concentration of the pentavalent transition metal is α, and the molar concentration of the trivalent transition metal is β, y may be α+β (y=α+β), and the content ratio (α/β) of the pentavalent transition metal and the trivalent transition metal may satisfy 0.4≤α/β≤2.0.

The accessory ingredients may include 0.5 to 1.4 moles of the first accessory ingredient, the oxide or carbide containing at least one of magnesium (Mg), barium (Ba), and calcium (Ca), based on 100 moles of the main ingredient of the base material; the second accessory ingredient, the oxide containing silicon (Si) or the glass compound containing silicon (Si); 0.6 to 1.5 moles of the third accessory ingredient, the oxide containing at least one of dysprosium (Dy), yttrium (Y), tin (Sn), holmium (Ho), and gadolinium (Gd), based on 100 moles of the main ingredient of the base material; and the fourth accessory ingredient, the oxide containing aluminum (Al).

When the content of the first accessory ingredient is a and the content of the second accessory ingredient is b, the content of the second accessory ingredient may satisfy a≤b≤2a.

The content of the fourth accessory ingredient may be 0.1 to 0.5 moles.

Since features of the dielectric composition are the same as those of the above-mentioned dielectric composition according to the exemplary embodiment, a detailed description thereof will be omitted.

Hereinafter, the present disclosure will be described in more detail through Inventive Examples and Comparative Examples, which are only used to help provide specific understanding of the present disclosure. Therefore, the scope of the present disclosure is not limited to the Inventive Examples.

Inventive Example

Compositions and contents of base material main ingredients and accessory ingredients of dielectric compositions were adjusted as illustrated in the following Table 1.

When the slurry was prepared, zirconia balls were used as mixing/dispersing media, and the main ingredient of the base material powder and accessory ingredient powders were mixed with ethanol/toluene, a dispersant, and a binder using an APEX mill.

A sheet having a thickness of 1.0 μm to 3 μm was manufactured using the prepared mixed slurry and a coater in a small doctor blade scheme.

Nickel (Ni) internal electrodes were printed on the sheets, upper and lower covers were manufactured by stacking several tens of cover sheets (thickness: ~3 μm), and the sheets on which the internal electrodes were printed were compressed and stacked, thereby manufacturing a bar. A compressed bar was cut into chips having a 3216 size (length×width: about 3.2 mm×1.6 mm) using a cutter.

After the cut chip was calcined, the calcined chip was sintered at 1050° C. to 1150° C. for 1 hour under a reducing atmosphere (0.1% $H_2$/99.9% $N_2$, $H_2O/H_2/N_2$), and then, the sintered chip was heat-treated at 1000° C. for 2 hours for re-oxidation.

The sintered chip was subjected to a termination process using a copper (Cu) paste and an electrode sintering process, thereby completing the external electrodes.

Room-temperature capacitance, dielectric loss, TCC characteristics, high-temperature reliability, and the like, of the multilayer ceramic capacitor completed as described above were evaluated.

The room-temperature capacitance and the dielectric loss of the multilayer ceramic capacitor (MLCC) chip were measured using a LCR-meter under the conditions of 1 kHz and AC 0.5V/μm.

In order to measure a capacitance change depending on temperature, a capacitance value was measured in a temperature range of −55° C. to 85° C. under the conditions of 1 kHz and AC 1.0V/μm, and a capacitance change rate was calculated based on a capacitance value at room temperature (25° C.).

Permittivity (relative permittivity) of the multilayer ceramic capacitor (MLCC) chip was calculated from the capacitance, a dielectric thickness, an area of internal electrodes, and the number of stacked layers of the multilayer ceramic capacitor (MLCC) chip.

High-temperature insulation resistance (IR) and high voltage tests were performed at 130° C. (1Vr=10V/μm), thereby evaluating high-temperature reliability.

TABLE 1

| Experimental Example (1 mole) | Base Material Main Ingredient $(Ba_m(Ti_{(1-y)}M_y)O_3)$ y = α + β | The Number of Mole of Each Accessory Ingredient Based on 1 mole of Base Material Main Ingredient | | | | Sintering Temperature (° C.) |
|---|---|---|---|---|---|---|
| | | First Accessory Ingredient | $SiO_2$ | Third Accessory Ingredient | $Al_2O_3$ | |
| 1* | α 0.0003 | BaO | 0.008 | $Dy_2O_3$ | 0.003 | 1130 |
| | β 0.0005 | 0.008 | | 0.009 | | |
| 2 | α 0.0005 | BaO | 0.008 | $Dy_2O_3$ | 0.003 | 1130 |
| | β 0.0005 | 0.008 | | 0.009 | | |
| 3 | α 0.0020 | BaO | 0.008 | $Dy_2O_3$ | 0.003 | 1130 |
| | β 0.0020 | 0.008 | | 0.009 | | |
| 4 | α 0.0050 | BaO | 0.008 | $Dy_2O_3$ | 0.003 | 1130 |
| | β 0.0050 | 0.008 | | 0.009 | | |

TABLE 1-continued

| Experimental Example (1 mole) | Base Material Main Ingredient $(Ba_m(Ti_{(1-y)}M_y)O_3)$ $y = \alpha + \beta$ | First Accessory Ingredient | SiO$_2$ | Third Accessory Ingredient | Al$_2$O$_3$ | Sintering Temperature (° C.) |
|---|---|---|---|---|---|---|
| 5 | α 0.0010 β 0.0020 | BaO 0.008 | 0.008 | Dy$_2$O$_3$ 0.009 | 0.003 | 1130 |
| 6* | α 0.0010 β 0.0030 | BaO 0.008 | 0.008 | Dy$_2$O$_3$ 0.009 | 0.003 | 1130 |
| 7 | α 0.0020 β 0.0010 | BaO 0.008 | 0.008 | Dy$_2$O$_3$ 0.009 | 0.003 | 1130 |
| 8* | α 0.0030 β 0.0010 | BaO 0.008 | 0.008 | Dy$_2$O$_3$ 0.009 | 0.003 | 1130 |
| 9* | α 0.0010 β 0.0010 | BaO 0.002 | 0.002 | Dy$_2$O$_3$ 0.009 | 0.003 | 1165 |
| 10 | α 0.0010 β 0.0010 | BaO 0.005 | 0.005 | Dy$_2$O$_3$ 0.009 | 0.003 | 1140 |
| 11 | α 0.0010 β 0.0010 | BaO 0.008 | 0.008 | Dy$_2$O$_3$ 0.009 | 0.003 | 1130 |
| 12 | α 0.0003 β 0.0005 | BaO 0.014 | 0.014 | Dy$_2$O$_3$ 0.009 | 0.003 | 1130 |
| 13* | α 0.0010 β 0.0010 | BaO 0.016 | 0.016 | Dy$_2$O$_3$ 0.009 | 0.003 | 1150 |
| 14* | α 0.0010 β 0.0010 | BaO 0.010 | 0.010 | Dy$_2$O$_3$ 0.003 | 0.003 | 1130 |
| 15 | α 0.0010 β 0.0010 | BaO 0.010 | 0.010 | Dy$_2$O$_3$ 0.006 | 0.003 | 1140 |
| 16 | α 0.0010 β 0.0010 | BaO 0.010 | 0.010 | Dy$_2$O$_3$ 0.009 | 0.003 | 1140 |
| 17 | α 0.0010 β 0.0010 | BaO 0.010 | 0.010 | Dy$_2$O$_3$ 0.012 | 0.003 | 1130 |
| 18 | α 0.0010 β 0.0010 | BaO 0.010 | 0.010 | Dy$_2$O$_3$ 0.015 | 0.003 | 1130 |
| 19* | α 0.0010 β 0.0010 | BaO 0.010 | 0.010 | Dy$_2$O$_3$ 0.018 | 0.003 | 1120 |
| 20 | α 0.0010 β 0.0010 | CaO 0.006 BaO 0.004 | 0.010 | Dy$_2$O$_3$ 0.009 | 0.003 | 1140 |
| 21 | α 0.0010 β 0.0010 | MgO 0.006 BaO 0.004 | 0.010 | Dy$_2$O$_3$ 0.009 | 0.003 | 1130 |
| 22 | α 0.0010 β 0.0010 | CaO 0.006 MgO 0.004 | 0.010 | Dy$_2$O$_3$ 0.009 | 0.003 | 1130 |
| 23* | α 0.0010 β 0.0010 | BaO 0.010 | 0.010 | Dy$_2$O$_3$ 0.009 | 0.003 | 1150 |
| 24 | α 0.0010 β 0.0010 | BaO 0.010 | 0.010 | Dy$_2$O$_3$ 0.009 | 0.003 | 1140 |
| 25 | α 0.0010 β 0.0010 | BaO 0.010 | 0.010 | Dy$_2$O$_3$ 0.009 | 0.003 | 1130 |
| 26* | α 0.0010 β 0.0010 | BaO 0.010 | 0.010 | Dy$_2$O$_3$ 0.009 | 0.003 | 1130 |
| 27* | α 0.0010 β 0.0010 | BaO 0.008 0.008 | 0.008 | Dy$_2$O$_3$ 0.01 | 0.003 | 1150 |

*Comparative Example

TABLE 2

| | Proto-type Chip Characteristics | | | Characteristic Judgment | | |
|---|---|---|---|---|---|---|
| Experimental Example | Permittivity | TCC (%) (85° C.) | High-Temperature Accelerated aging (Vr) (130° C.) | Permittivity | TCC (%) (85° C.) | High-Temperature Accelerated aging (Vr) (130° C.) |
| 1* | 7410 | −14.7 | 3 | ○ | ○ | x |
| 2 | 7230 | −12.9 | 4 | ○ | ○ | ○ |
| 3 | 6560 | −11.4 | 4 | ○ | ○ | ○ |
| 4 | 6080 | −10.6 | 4 | ○ | ○ | ○ |
| 5 | 6550 | −11.1 | 5 | ○ | ○ | ○ |

TABLE 2-continued

|  | Proto-type Chip Characteristics | | | Characteristic Judgment | | |
| --- | --- | --- | --- | --- | --- | --- |
| Experimental Example | Permittivity | TCC (%) (85° C.) | High-Temperature Accelerated aging (Vr) (130° C.) | Permittivity | TCC (%) (85° C.) | High-Temperature Accelerated aging (Vr) (130° C.) |
| 6* | 5890 | −10.9 | 5 | x | ○ | ○ |
| 7 | 6630 | −12.8 | 4 | ○ | ○ | ○ |
| 8* | 6040 | −12.4 | 3 | ○ | ○ | x |
| 9* | 6100 | −11.5 | 3 | ○ | ○ | x |
| 10 | 6680 | −12.6 | 4 | ○ | ○ | ○ |
| 11 | 6810 | −13.1 | 5 | ○ | ○ | ○ |
| 12 | 6290 | −13.5 | 5 | ○ | ○ | ○ |
| 13* | 5780 | −12.8 | 4 | x | ○ | ○ |
| 14* | 5900 | −10.9 | 5 | x | ○ | ○ |
| 15 | 6270 | −12.2 | 5 | ○ | ○ | ○ |
| 16 | 6520 | −13.7 | 4 | ○ | ○ | ○ |
| 17 | 6830 | −13.9 | 4 | ○ | ○ | ○ |
| 18 | 7110 | −14.6 | 4 | ○ | ○ | ○ |
| 19* | 7200 | −15.5 | 2 | ○ | x | x |
| 20 | 6420 | −13.5 | 4 | ○ | ○ | ○ |
| 21 | 6310 | −14.3 | 4 | ○ | ○ | ○ |
| 22 | 6190 | −14.7 | 4 | ○ | ○ | ○ |
| 23* | 6310 | −12.1 | 4 | ○ | ○ | ○ |
| 24 | 6670 | −14.1 | 4 | ○ | ○ | ○ |
| 25 | 6740 | −13.5 | 4 | ○ | ○ | ○ |
| 26* | 6790 | −15.3 | 3 | ○ | x | x |
| 27* | 5630 | −11.9 | 4 | x | ○ | ○ |

○: Good,
x: Defective
*Comparative Example

Referring to Table 2, it may be appreciated that since the multilayer ceramic capacitors containing the dielectric composition according to the exemplary embodiment tended to have permittivity of 600 or more and a stable high-temperature accelerated aging value of 4Vr or more, high permittivity and excellent reliability may be secured.

On the other hand, it may be appreciated that in Comparative Example 1 in which $0.001 \leq y \leq 0.010$ was not satisfied, the high-temperature accelerated aging was decreased.

In Comparative Examples 6 and 8, $0.4 \leq \alpha/\beta \leq 2.0$ was not satisfied.

It may be appreciated that in Comparative Example 6 in which $\alpha/\beta$ was less than 0.4, that is, a case in which the molar concentration of the trivalent transition metal was relatively high as compared to the molar concentration of the pentavalent transition metal, permittivity of the capacitor was not secured.

It may be appreciated that in Comparative Example 6 in which $\alpha/\beta$ was more than 2.0, high-temperature reliability was not secured.

In Comparative Examples 9, 13, and 27, the content of the first accessory ingredient was out of the range of 0.005 to 0.014 moles based on 1 mole of the main ingredient of the base material.

It may be appreciated that in Comparative Example 9 in which the content of the first accessory ingredient was less than 0.005 moles, high-temperature reliability of the capacitor was deteriorated, and the sintering temperature was increased due to a decrease in sintering stability.

It may be appreciated that in Comparative Examples 13 and 27 in which the content of the first accessory ingredient was more than 0.014 moles, the sintering temperature was increased, and permittivity was less than 6000, and thus high permittivity was not secured.

It may be appreciated that in Comparative Example 23 in which the content of the second accessory ingredient was lower than the content of the first accessory ingredient, the sintering temperature was increased.

It may be appreciated that in Comparative Example 26 in which the content of the second accessory ingredient was higher than two times the content of the first accessory ingredient, high-temperature reliability was deteriorated, and the TCC characteristics were unstable.

In Comparative Examples 14 and 19, the content of the third accessory ingredient was out of the range of 0.006 to 0.015 moles based on 1 mole of the main ingredient of the base material.

It may be appreciated that in Comparative Example 14 in which the content of the third accessory ingredient was less than 0.006 moles, permittivity of the capacitor was decreased, and in Comparative Example 19 in which the content of the third accessory ingredient was more than 0.015 moles, the high-temperature accelerated aging was significantly decreased.

As set forth above, according to exemplary embodiments, the dielectric composition having high permittivity and excellent reliability by doping the main ingredient of the base material with the transition metal and the multilayer ceramic capacitor containing the same may be provided.

While exemplary embodiments have been shown and described above, it will be apparent to those skilled in the art that modifications and variations could be made without departing from the scope of the present inventive concept as defined by the appended claims.

What is claimed is:
1. A dielectric composition comprising:
a main ingredient and accessory ingredients,
wherein the main ingredient is represented by $Ba_m(Ti_{(1-y)}M_y)O_3$ ($0.990 < m < 1.015$, $0.001 \leq y \leq 0.010$), where M is a transition metal including at least one of a pentavalent transition metal and at least one of a trivalent transition metal, and y is α+β (y=α+β), and a content ratio (α/β) of the pentavalent transition metal and the trivalent transition metal satisfies 0.4≤α/β≤2.0, where α is a molar concentration of the pentavalent transition metal, and β is a molar concentration of the trivalent transition metal.

2. The dielectric composition of claim 1, wherein the accessory ingredients include:
   0.5 to 1.4 moles of a first accessory ingredient, an oxide or carbide containing at least one of magnesium (Mg), barium (Ba), and calcium (Ca), based on 100 moles of the main ingredient;
   a second accessory ingredient, an oxide containing silicon (Si) or a glass compound containing silicon (Si);
   0.6 to 1.5 moles of a third accessory ingredient, an oxide containing at least one of dysprosium (Dy), yttrium (Y), tin (Sn), holmium (Ho), and gadolinium (Gd), based on 100 moles of the main ingredient; and
   a fourth accessory ingredient, an oxide containing aluminum (Al).

3. The dielectric composition of claim 1, wherein the transition metal includes at least one of manganese (Mn), chromium (Cr), vanadium (V), nickel (Ni), iron (Fe), and cobalt (Co).

4. The dielectric composition of claim 2, wherein a≤b≤2a, where a is a content of the first accessory ingredient, and b is a content of the second accessory ingredient is b.

5. The dielectric composition of claim 2, wherein a content of the fourth accessory ingredient is 0.1 to 0.5 moles, based on 100 moles of the main ingredient.

6. A multilayer ceramic capacitor comprising:
   a ceramic body having a structure in which dielectric layers and first and second internal electrodes are alternately stacked; and
   first and second external electrodes formed on both end portions of the ceramic body and electrically connected to the first and second internal electrodes, respectively, wherein the dielectric layers contain a main ingredient and accessory ingredients, the main ingredient being represented by $Ba_m(Ti_{(1-y)}M_y)O_3$ (0.990<m<1.015, 0.001≤y≤0.010), where M is a transition metal including at least one of a pentavalent transition metal and at least one of a trivalent transition metal, and
   y is α+β (y=α+β), and a content ratio (α/β) of the pentavalent transition metal and the trivalent transition metal satisfies 0.4≤α/β≤2, where α is a molar concentration of the pentavalent transition metal, and β is a molar concentration of the trivalent transition metal.

7. The multilayer ceramic capacitor of claim 6, wherein the accessory ingredients include:
   0.5 to 1.4 moles of a first accessory ingredient, an oxide or carbide containing at least one of magnesium (Mg), barium (Ba), and calcium (Ca), based on 100 moles of the main ingredient;
   a second accessory ingredient, an oxide containing silicon (Si) or a glass compound containing silicon (Si);
   0.6 to 1.5 moles of a third accessory ingredient, an oxide containing at least one of dysprosium (Dy), yttrium (Y), tin (Sn), holmium (Ho), and gadolinium (Gd), based on 100 moles of the main ingredient; and
   a fourth accessory ingredient, an oxide containing aluminum (Al).

8. The multilayer ceramic capacitor of claim 6, wherein the transition metal includes at least one of manganese (Mn), chromium (Cr), vanadium (V), nickel (Ni), iron (Fe), and cobalt (Co).

9. The multilayer ceramic capacitor of claim 7, wherein a≤b≤2a, where a is a content of the first accessory ingredient, and b is a content of the second accessory ingredient is b.

10. The multilayer ceramic capacitor of claim 7, wherein a content of the fourth accessory ingredient is 0.1 to 0.5 moles, based on 100 moles of the main ingredient.

* * * * *